United States Patent
Hewko et al.

[15] 3,702,083
[45] Nov. 7, 1972

[54] TRANSMISSION

[72] Inventors: Lubomyr O. Hewko, Port Clinton; Richard K. Kepple, Huron, both of Ohio

[73] Assignee: General Motors Corporation, Detroit, Mich.

[22] Filed: July 14, 1971

[21] Appl. No.: 162,593

[52] U.S. Cl. ..................................................74/752 E
[51] Int. Cl. ..................................................F16h 5/42
[58] Field of Search ..................................74/752 E

[56] References Cited

UNITED STATES PATENTS

| | | | |
|---|---|---|---|
| 1,895,199 | 1/1933 | McDowell | 74/752 E |
| 1,909,191 | 5/1933 | Stafford | 74/752 E |
| 2,022,058 | 11/1935 | Steuber | 74/752 E |
| 2,382,088 | 8/1945 | Moffitt | 74/752 E |
| 2,593,804 | 4/1952 | Schott | 74/752 E |
| 3,048,056 | 8/1962 | Wolfram | 74/752 E |
| 3,254,545 | 6/1966 | Witte et al. | 74/752 E |
| 3,461,746 | 8/1969 | Schwerdhofer | 74/752 E |

*Primary Examiner*—C. J. Husar
*Attorney*—Warren E. Finken et al.

[57] ABSTRACT

These two-speed accessory drive transmissions have spring-loaded centrifugal weights and a planetary friction unit including inner and outer ring members and intermediate ball planets. In one embodiment, the centrifugal weights are urged into frictional drive contact with the planetary carrier during low engine speeds for driving various engine accessories operatively connected to the outer ring member in overdrive. A one-way clutch is located between and connects the input pulley hub and the outer ring member upon disengagement of the centrifugal weights from the carrier under the action of centrifugal force. In an alternate embodiment, the inner ring member is connected to drive accessories, and the outer ring member is the reaction member. The centrifugal weights are remotely connected to drive the carrier via a connector member extending past the outer ring member of the planetary unit.

10 Claims, 4 Drawing Figures

PATENTED NOV 7 1972

3,702,083

INVENTORS
Lubomyr O. Hewko, &
BY Richard K. Kepple

John P. Moran
ATTORNEY

TRANSMISSION

This invention relates generally to transmissions and, more particularly, to two-speed transmissions.

This invention provides an improved transmission for driving engine accessories at two different speed ratios with respect to engine speed. For example, it may be desirable to overdrive an engine accessory, such as an engine cooling fan and/or water pump impeller, or other accessories, at low engine speeds, and then, at a predetermined higher engine speed, to drive the accessory at a 1:1 speed ratio therewith.

Accordingly, an object of the invention is to provide improved means for operating various engine accessories at two different speed ratios with respect to the engine speed.

Another object of the invention is to provide improved coordinated friction and centrifugal types of speed-changing arrangements cooperating with a one-way clutch for providing an overdrive at low engine speeds and automatically reducing the speed ratio to 1:1 at predetermined higher engine speeds.

A further object of the invention is to provide an improved ball planetary friction device for controlling output speed at low engine speeds, and cooperating centrifugally actuated means for rendering the ball planetary friction device ineffective at predetermined higher engine speeds.

A still further object of the invention is to incorporate a one-way clutch which becomes operative upon the disengaging action of centrifugal weight members for driving a transmission output at the same speed as the input from the engine at all speeds above a predetermined engine speed.

Still another object of the invention is to provide an improved ball planetary friction device and cooperating spring-loaded speed-responsive means for varying the output speed relative to the input speed at low engine speeds, and a one-way clutch arrangement for effectuating direct drive once the speed-responsive means releases its connection with the planetary device at a predetermined higher engine speed.

These and other objects and advantages of the invention will become apparent when reference is made to the following description and accompanying drawings, wherein.

FIGURE 1 EMBODIMENT

Figure 1:
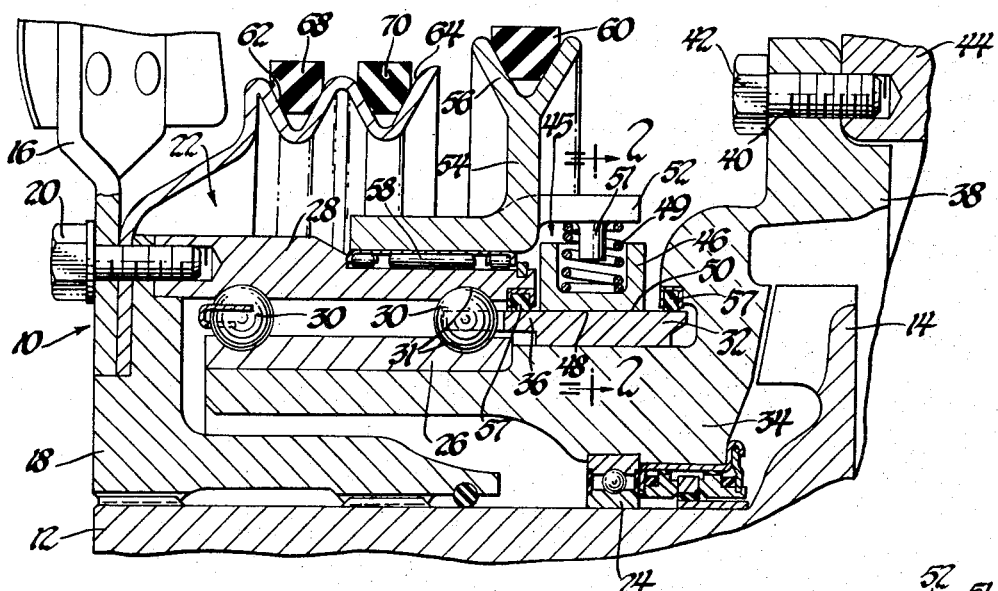
FIG. 1 is a fragmentary cross-sectional view of an accessory drive mechanism embodying the invention.

Referring now to the drawings in greater detail, FIG. 1 illustrates a two-speed accessory drive mechanism 10 including a central shaft 12 suitable for connection with predetermined engine accessories, such as a water pump impeller 14 mounted on one end thereof and a cooling fan 16 and an associated flange member 18 mounted on the other end thereof. The fan 16 is secured to the flange member 18 by bolts 20, while the flange member 18, in turn, is secured by any suitable means to the central shaft 12.

A planetary friction drive unit 22 is mounted on sealed bearings 24 around the central shaft 12, intermediate the water pump impeller 14 and the flange member 18. The planetary unit 22 includes inner and outer ring members 26 and 28, respectively, with a plurality of spaced ball members 30 mounted intermediate thereof so as to frictionally contact both the respective inner and outer ring members 26 and 28. Oppositely disposed contoured annular surfaces 31 may be formed in the inner and outer ring members 26 and 28 to guide the ball members 30 in their circumferential travel. A carrier member 32 is mounted around a sleeve-like extension 34 formed on the inner ring member 26 and includes fingers 36 extending between the ball members 30 and serving as a means for separating the driving same. An external flange 38 is formed on the sleeve-like extension 34 and includes openings 40 formed therein suitable for insertion of bolts 42 serving to secure the flange 38, the sleeve-like extension 34 and the inner ring member 26 to a fixed abutment or the front of the engine, represented generally as 44.

Figure 2:
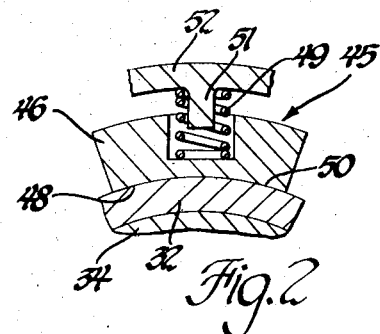
FIG. 2 is a fragmentary cross-sectional view taken along the plane of line 2—2 of FIG. 1, and looking in the direction of the arrows.

A centrifugal clutch 45 includes a plurality of weight members 46 with arcuate-shaped bottom surfaces 48 (FIG. 2) formed thereon. The weight members 46 are mounted around the carrier member 32 and urged by suitable resilient members, such as coil springs 49, into contact with mating annular surfaces 50 formed on the outer periphery of the carrier member 32. The springs 49 are retained at their radially outer ends by retainers 51 formed on mounting abutments 52 secured to the hub 54 of an input pulley 56. Suitable seals 57 are mounted between the carrier 32 and the outer ring member 28 and between the carrier 32 and the flange 38. A one-way clutch 58 is mounted intermediate the outer ring member 28 and the pulley hub 54. A suitable belt 60 is mounted in the input pulley 56, the belt 60 being operatively connected to the engine crankshaft (not shown).

If desired, additional pulley grooves 62 and 64 may be formed on an extension member 66 secured, along with the fan 16, to the associated flange member 18 by the bolts 20. Such additional pulley grooves 62 and 64 may serve to accommodate belts 68 and 70, respectively, for driving additional engine accessories, such as an alternator and an air-conditioner compressor (not shown).

OPERATION

At low engine speeds, the input drive pulley 56, driven by the belt 60, rotates the retainer abutments 52, the springs 49 and the associated centrifugal weight members 46. Since the springs 49 urge the bottom surfaces 48 of the weight members 46 into frictional engagement with the annular mating surfaces 50 of the carrier member 32, the latter, along with the associated ball members 30, will also be driven at input speed. The ball members 30 will rotate around the fixed inner ring member 26 and cause the rotation of the outer ring member 28 at an increased speed with respect to the speed of the input pulley 56 and hence serve to overdrive the cooling fan 16, the flange member 18, the central shaft 12 and the water pump impeller 14, the one-way clutch 58 being overdriven at the time.

At a predetermined higher engine speed, the centrifugal weight members 46 will be urged radially outwardly under the action of centrifugal force, overcoming the force of the springs 49 and progressively slipping and then releasing their frictional grip on the annular surface 50 of the carrier member 32. As a result, the outer ring member 28 loses speed until such time as the one-way clutch 58, mounted between the input pulley 56 hub 54 and the outer ring member 28 locks. The belt 60 and the input pulley 56 thereupon drive the flange member 18 directly via the outer ring member 28, thus rotating the fan 16, the central shaft 12, and the water pump impeller 14 at engine speed.

FIGURE 3 EMBODIMENT

Figure 3:
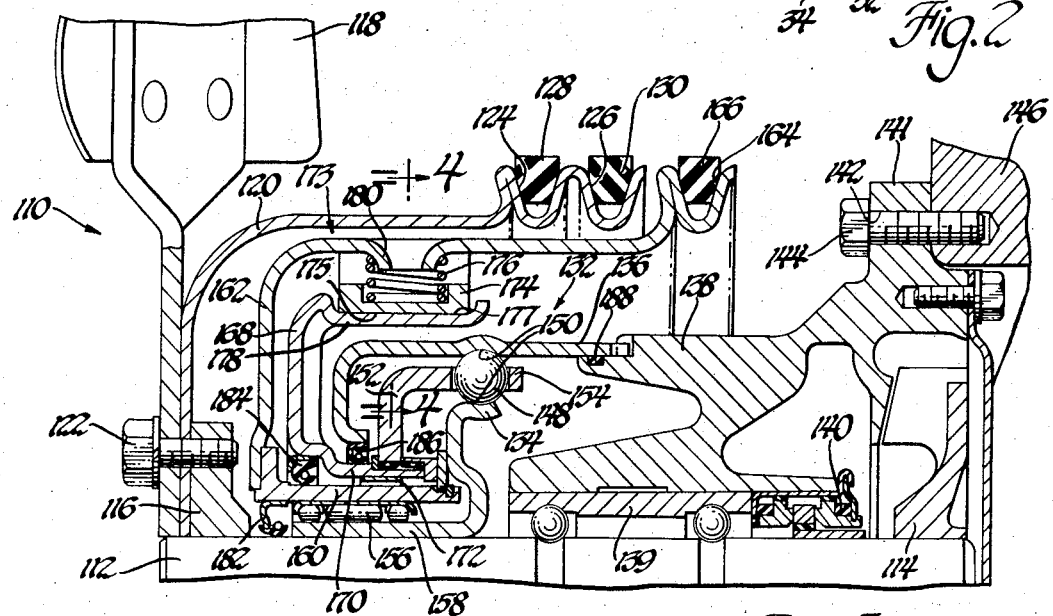
FIG. 3 is a fragmentary cross-sectional view of an accessory drive mechanism illustrating a modification of the invention.

The two-speed accessory drive mechanism 110 illustrated in FIG. 3 is generally similar to the FIG. 1 arrangement and includes a central shaft 112 having a water pump impeller 114 mounted on one end thereof and an output flange member 116 formed on the other end thereof. A cooling fan 118 and a drive member 120 are secured to the output flange member 116 by bolts 122. Pulley grooves 124 and 126 are formed on the outer periphery of the drive member 120 suitable for mounting therein of belts 128 and 130 for driving other engine accessories, such as an alternator and air-conditioner compressor (not shown).

A planetary friction drive unit 132 is mounted around the central shaft 112 intermediate the output flange member 116 and the water pump impeller 114. An inner ring member 134 of the planetary unit 132 includes a sleeve-like hub 158 which is secured directly to the central shaft 112. An outer ring member 136 is secured to a suitable fixed abutment or housing 138, such as the water pump housing, the latter being mounted on bearings 139 on the central shaft 112 and having a seal 140 mounted adjacent the bearings 139. An external flange 141 is formed on the housing 138 and includes openings 142 formed therein suitable for the mounting of bolts 144 to secure the housing 138 to the front of the engine, represented generally as 146. A plurality of ball members 148 are mounted in oppositely disposed contoured annular surfaces 150 formed in the inner and outer ring members 134 and 136, respectively. A carrier member 152 has fingers 154 extending axially therefrom between adjacent ball members 148 to separate and drive same.

A one-way clutch 156 is mounted around the sleeve member 158 formed on the inner ring member 134, the sleeve member 158 being secured by any suitable means to the central shaft 112. A hub member 160 is mounted around the one-way clutch 156, there being an input drive member 162 secured to the hub member 160, with the drive member 162 having an input pulley groove 164 formed on the outer periphery thereof. A suitable belt 166 is mounted in the input pulley 164 and operatively connected to the engine crankshaft (not shown).

Figure 4:
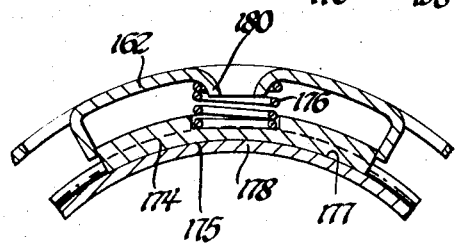
FIG. 4 is a fragmentary cross-sectional view taken along the plane of line 4—4 of FIG. 3, and looking in the direction of the arrows.

A connector member 168 is mounted at a radial inner cylindrical portion 170 thereof on bearings 172 around the hub member 160. A centrifugal clutch 173 includes a plurality of centrifugal weight members 174 having arcuate-shaped bottom surfaces 175 (FIG. 4). The weight members 174 are urged by springs 176 into contact with an annular seat 177 formed on the outer periphery of a radial outer cylindrical portion 178 of the connector member 168. The springs 176 are operative between the centrifugal weight members 174 and the input drive member 162, being mounted around projections 180 formed on the input drive member 162. The carrier 152 is secured to the inner cylindrical portion 170 of the connector member 168. Seals 182, 184, 186, and 188 are mounted between the central shaft 112, and the hub member 160, the connector member 168 between the connector member 168 and the outer ring member 136 and between the outer ring member 136 and the housing 138, respectively.

OPERATION

During low engine speeds, the drive belt 166, the drive pulley 164 and the associated drive member 162, serve to rotate the centrifugal weight members 174 which, in turn, being urged by the springs 176 into frictional engagement with the annular surface 177 formed on the outer cylindrical portion 178 of the connector member 168, cause the rotation of the carrier member 152. The carrier member 152, in turn, causes the ball members 148 to "walk around " the contoured annular surfaces 150 of the fixed outer ring member 136, thereby rotating the inner ring member 134, the central shaft 112, and the associated engine accessories at an increased speed with respect to the speed of the input pulley 164.

Once a predetermined higher engine speed is attained, the centrifugal weight members 174 will be urged radially outwardly under the action of centrifugal force, overcoming the force of the springs 176 and releasing their frictional grip on the annular surface 177 of the outer cylindrical portion 178 of the connector member 168. As a result, the carrier member 152, ball members 148, and the inner ring member 134 will begin to lose speed until such time as the one-way clutch 156 becomes engaged between the inner ring sleeve member 158 on the shaft 112 and the hub member 160 driven by the input pulley 164. The input pulley 164 and the drive member 162 thereafter, through the one-way clutch 156, drive the central shaft 112 and the associated engine accessories at input speed.

It should be apparent that the invention provides an improved planetary friction drive coordinated with centrifugal weights which frictionally contact the carrier thereof at low engine speeds to vary the speed of one or several engine accessories relative to input speed, with a cooperating one-way clutch for direct drive of the accessories once the centrifugal weights release their frictional grip on the carrier.

While but two embodiments of the invention have been shown and described, other modifications thereof are possible.

We claim:

1. A transmission comprising input and output means; a planetary drive unit including a first member mounted for rotation with said output means, a reaction member, intermediate traction members frictionally contacting said first and reaction members, and a carrier member for driving said traction members; centrifugally actuated means for operatively connecting said carrier member to said input means; resilient means operatively connected to said input means for urging said centrifugally actuated means into operational engagement with said carrier member at all input speeds below a predetermined value; and one-way clutch means operatively connected between one of said first and reaction members and one of said input and output means, said one-way clutch means serving to operatively connect said input means to said output means for direct drive of said output means upon radial outward releasing movement of said centrifugally actuated means from said carrier member at all input speeds above a predetermined value.

2. A transmission comprising an input pulley and an output shaft; a planetary drive unit including a first member mounted for rotation with said output shaft, a fixed second member, intermediate traction members frictionally contacting said first and second members, and a carrier member for driving said traction members; centrifugally actuated means for operatively connecting said carrier member to said input pulley; resilient means mounted on said input pulley for urging said centrifugally actuated means into frictional engagement with said carrier member at all input speeds below a predetermined value; and one-way clutch means operatively connected between one of said first and second members and said input pulley, said one-way clutch means serving to operatively connect said input pulley to said first member for direct drive of said output shaft upon radial outward releasing movement of said centrifugally actuated means from said carrier member at all input speeds above a predetermined value.

3. A transmission comprising input and output means; a planetary drive unit including an outer ring member secured to said output means, a fixed inner ring member, intermediate ball planets frictionally contacting said inner and outer ring members, and a carrier member for driving said ball planets; centrifugal weight members mounted adjacent said carrier member; resilient means retained at one end thereof by said input means for urging said centrifugal weight members radially inwardly into rotational engagement with said carrier member at all input speeds below a predetermined value; and a one-way clutch operatively connected between said input means and said outer ring member for driving said outer ring member and said output means directly upon radial outward releasing movement of said centrifugal weight members from said carrier member at all input speeds above a predetermined value.

4. A transmission comprising an input pulley means and a central output shaft; a planetary drive unit including a fixed inner ring member, an outer ring member, a flange member interconnecting said outer ring member and said central output shaft, intermediate ball planet pinions frictionally contacting said inner and outer ring members, and a carrier member for driving said ball planet pinions; means for operatively connecting said carrier member to said input pulley means including retainer means connected to said input pulley means, centrifugal weight members mounted adjacent said carrier member, and resilient means mounted between said retainer means and said centrifugal weight members for urging said centrifugal weight members radially inwardly into fractional engagement with said carrier member at all input speeds below a predetermined value; and a one-way clutch rotatably mounted between said input pulley means and said outer ring member, said one-way clutch serving to operatively interconnect said input pulley means, said outer ring member, said flange member and said central output shaft in direct drive relationship upon radial outward releasing movement of said centrifugal weight members from said carrier member at all input speeds above a predetermined value.

5. A transmission comprising input and output means; a planetary drive unit including an inner ring member secured to said output means, a fixed outer ring member, intermediate ball planets frictionally contacting said inner and outer ring members, and a carrier member for driving said ball planets; a connector member secured to said carrier member and extending therefrom; centrifugal weight members mounted adjacent said connector member; resilient means retained at one end thereof by said input means for urging said centrifugal weight members radially inwardly into rotational engagement with said connector member at all input speeds below a predetermined value; and a one-way clutch operatively connected between said input means and said inner ring member for driving said inner ring member and said output means directly upon radial outward releasing movement of said centrifugal weight members from said connector member at all input speeds above a predetermined value.

6. A transmission comprising an input pulley means and a central output shaft; a planetary drive unit including a fixed outer ring member, an inner ring member, a sleeve member interconnecting said inner ring member and said central output shaft, intermediate ball planet pinions fractionally contacting said inner and outer ring members, and a carrier member for driving said ball planet pinions; means for operatively connecting said carrier member to said input pulley means including a connector member connected to said carrier member, centrifugal weight members mounted adjacent said connector member, and resilient means mounted between said input pulley means and said centrifugal weight members for urging said centrifugal weight members radially inwardly into frictional engagement with said connector member to drive said carrier member at all input speeds below a predetermined value; and a one-way clutch rotatably mounted between said input pulley means and said sleeve member, said one-way clutch serving to operatively interconnect said input pulley means, said inner ring member, said sleeve member and said central output shaft in direct drive relationship upon radial outward releasing movement of said centrifugal weight members from said connector member at all input speeds above a predetermined value.

7. A transmission comprising an input pulley means and a central output shaft; a planetary drive unit including a fixed inner ring member, an outer ring member, a flange member interconnecting said outer ring member and said central output shaft, intermediate ball planet pinions fractionally contacting said inner and outer ring members, and a carrier member for driving said ball planet pinions; means for operatively connecting said carrier member to said input pulley means including retainer means connected to said input pulley means, centrifugal weight members mounted adjacent said carrier member and resilient means mounted between said retainer means and said centrifugal weight members for urging said centrifugal weight members radially inwardly into frictional engagement with said carrier member at all input speeds below a predetermined value; and a one-way clutch rotatably mounted between said input pulley means and said outer ring member, said one-way clutch serving to operatively interconnect said input pulley means, and outer ring member, said flange member and said central output shaft in direct drive relationship upon radial outward releasing movement of said centrifugal weight members from said carrier member at all input speeds above a predetermined value.

8. A transmission comprising an input pulley means and a central output shaft; a planetary drive unit including a fixed outer ring member, an inner ring member, a sleeve member interconnecting said inner ring member and said central output shaft, intermediate ball planet pinions fractionally contacting said inner and outer ring members, and a carrier member for driving said ball planet pinions; means for operatively connecting said carrier member to said input pulley means including a connector member connected to said carrier member, centrifugal weight members mounted adjacent said connector member, and resilient means mounted between said input pulley means and said centrifugal weight members for urging said centrifugal weight members radially inwardly into fractional engagement with said connector member to drive said carrier member at all input speeds below a predetermined value; and a one-way clutch rotatably mounted between said input pulley means and said sleeve member, said one-way clutch serving to operatively interconnect said input pulley means, said inner ring member, said sleeve member and said central output shaft in direct drive relationship upon radial outward releasing movement of said centrifugal weight members from said connector member at all input speeds above a predetermined value.

9. A transmission comprising an input pulley and an output shaft; a hub formed on said input pulley; a planetary drive unit including a fixed inner ring member, an outer ring member, a radially inwardly extending flange member secured to said outer ring member, splines formed on said flange member and on said output shaft for interconnecting said outer ring member and said output shaft, intermediate ball planet pinions frictionally contacting said inner and outer ring members, and an annular carrier member having fingers extending axially therefrom intermediate adjacent ball planet pinions for driving said ball planet pinions; means for operatively connecting said carrier member to said input pulley including an annular ring formed on a side of said input pulley, a plurality of spaced retainer members formed on the inner surface of said annular ring, arcuate-shaped centrifugal weight members mounted adjacent said carrier member, a retainer pocket formed in the radially outer surface of each of said weight members, said pockets being radially aligned with said retainer members, a spring mounted in each of said pockets and around each radially aligned retainer member for urging said centrifugal weight members radially inwardly into frictional engagement with said annular carrier member at all input speeds below a predetermined value; and a one-way clutch rotatably mounted between said hub of said input pulley and said outer ring member, said one-way clutch serving to operatively interconnect said input pulley, said outer ring member, said flange member and said output shaft in direct drive relationship upon radial outward movement of said centrifugal weight members from said carrier member against the force of said springs at all inputs speeds above a predetermined value.

10. A transmission comprising an input pulley and an output shaft, a fixed outer planetary ring member, an inner planetary ring member, an annular hub member formed on said inner ring member and secured to said output shaft, a one-way clutch mounted around said annular hub member, an input ring member formed on said input pulley, an inwardly extending flange formed on said input ring member, a hub member formed on said flange and mounted around said one-way clutch, bearings mounted around said hub member of said flange, an annular connector member having an outer ring mounted within said input ring member and a hub ring mounted on said bearings, ball planet pinions frictionally contacting said inner and outer ring members, a carrier member secured to said hub ring of said connector member for driving said ball planet pinions, a plurality of retainers formed on the radially inner surface of said input ring member, a plurality of arcuate-shaped centrifugal weight members mounted intermediate said outer ring of said connector member and said inner surface of said input ring member, a pocket formed in the radially outer surface of each of said weight members, a spring mounted in each of said pockets and around each of said retainers on said input ring member for urging said centrifugal weight members radially inwardly into frictional engagement with said outer ring of said connector member to drive said carrier member at all input speeds below a predetermined value, said one-way clutch serving to operatively interconnect said input pulley, said inner ring member, and said output shaft in direct drive relationship upon radial outward releasing movement of said centrifugal weight members from said outer ring of said connector member against the force of said springs at all input speeds above a predetermined value.

* * * * *